United States Patent
Kato et al.

(10) Patent No.: US 10,240,237 B2
(45) Date of Patent: Mar. 26, 2019

(54) BLACK COUPLING MEMBER FOR VEHICLES, HAVING EXCELLENT CORROSION RESISTANCE AND BLACK APPEARANCE

(71) Applicants: DIPSOL CHEMICALS CO., LTD., Chuo-ku, Tokyo (JP); Honda Motor Co., Ltd., Minato-ku, Tokyo (JP)

(72) Inventors: Yasuhiro Kato, Funabashi (JP); Toshiki Inomata, Koshigaya (JP); Manabu Inoue, Katsushika (JP); Hiroyuki Yoshida, Wako (JP); Hiroshi Hirayama, Wako (JP); Shinsuke Mochizuki, Wako (JP); Toshiyasu Nagai, Wako (JP)

(73) Assignees: DIPSOL CHEMICALS CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 464 days.

(21) Appl. No.: 14/915,120

(22) PCT Filed: Aug. 19, 2014

(86) PCT No.: PCT/JP2014/071646
§ 371 (c)(1),
(2) Date: Feb. 26, 2016

(87) PCT Pub. No.: WO2015/029837
PCT Pub. Date: Mar. 5, 2015

(65) Prior Publication Data
US 2016/0186329 A1    Jun. 30, 2016
US 2017/0283956 A9    Oct. 5, 2017

(30) Foreign Application Priority Data
Aug. 28, 2013   (JP) ................. 2013-176909

(51) Int. Cl.
| | |
|---|---|
| F16B 35/04 | (2006.01) |
| C23C 22/53 | (2006.01) |
| B05D 7/14 | (2006.01) |
| C09D 183/04 | (2006.01) |
| C23C 28/00 | (2006.01) |
| B05D 5/06 | (2006.01) |
| C23C 22/83 | (2006.01) |
| C23C 2/06 | (2006.01) |
| C23C 2/26 | (2006.01) |
| C23C 22/84 | (2006.01) |
| F16B 35/00 | (2006.01) |
| C09D 183/12 | (2006.01) |
| C09D 7/40 | (2018.01) |
| B05D 3/02 | (2006.01) |
| C08G 77/46 | (2006.01) |

(52) U.S. Cl.
CPC ............ *C23C 22/53* (2013.01); *B05D 5/06* (2013.01); *B05D 7/14* (2013.01); *C09D 7/40* (2018.01); *C09D 183/04* (2013.01); *C09D 183/12* (2013.01); *C23C 2/06* (2013.01); *C23C 2/26* (2013.01); *C23C 22/83* (2013.01); *C23C 22/84* (2013.01); *C23C 28/00* (2013.01); *C23C 28/3225* (2013.01); *C23C 28/3455* (2013.01); *F16B 35/00* (2013.01); *B05D 3/0254* (2013.01); *C08G 77/46* (2013.01); *C23C 2222/10* (2013.01)

(58) Field of Classification Search
CPC .................................................... C23C 22/53
USPC ........................................................ 411/424
See application file for complete search history.

(56) References Cited

U.S. PATENT DOCUMENTS

| | | | | |
|---|---|---|---|---|
| 5,023,146 A | * | 6/1991 | Saito ................. | C23C 22/78 428/623 |
| 5,387,473 A | * | 2/1995 | Yoshimi ............ | B05D 7/14 428/623 |
| 5,393,353 A | * | 2/1995 | Bishop .............. | C23C 22/08 148/253 |
| 7,160,630 B2 | * | 1/2007 | Klos ................. | C25D 5/48 411/378 |

(Continued)

FOREIGN PATENT DOCUMENTS

| | | |
|---|---|---|
| JP | 2-78540 A | 3/1990 |
| JP | 7-37107 B2 | 4/1995 |

(Continued)

OTHER PUBLICATIONS

Japanese Patent Office, International Search Report in PCT/JP2014/071646, dated Nov. 25, 2014.

(Continued)

*Primary Examiner* — Gary W Estremsky
(74) *Attorney, Agent, or Firm* — Hoffmann & Baron, LLP

(57) ABSTRACT

Provided is a black coupling member for vehicles, comprising a trivalent chromium black chemical conversion film and a black coating film upon the trivalent chromium black chemical conversion film, on the surface of a zinc-plated metal substrate. The trivalent chromium black chemical conversion film is formed using a hexavalent chromium-free trivalent chromium black chemical conversion treatment solution having a Zn ion concentration of no more than 20 g/L. The lightness (L) of the trivalent chromium black chemical conversion film is no more than 33. The black coating film includes a black chemical conversion component, a modified organopolysiloxane, and a friction coefficient-adjustment component. The black chemical conversion component content is 2-25 wt % relative to 100 wt % of the black coating film. The lightness (L) is no more than 28.

7 Claims, No Drawings

(56) References Cited

U.S. PATENT DOCUMENTS

| | | | |
|---|---|---|---|
| 7,314,671 B1* | 1/2008 | Preikschat | C23C 22/34 |
| | | | 428/472.1 |
| 7,842,403 B2* | 11/2010 | Meyer, Jr. | C09D 7/40 |
| | | | 428/686 |
| 8,070,886 B2* | 12/2011 | Inoue | C23C 22/47 |
| | | | 106/14.05 |
| 8,084,528 B2* | 12/2011 | Miyahara | C09D 7/61 |
| | | | 524/413 |
| 9,315,902 B2* | 4/2016 | Sugiura | C23C 22/53 |
| 2005/0109426 A1 | 5/2005 | Inoue et al. | |
| 2006/0166013 A1* | 7/2006 | Endo | C09D 5/084 |
| | | | 428/450 |
| 2007/0196632 A1 | 8/2007 | Meyer et al. | |
| 2008/0210341 A1* | 9/2008 | Yamamoto | C23C 22/17 |
| | | | 148/267 |
| 2009/0020185 A1 | 1/2009 | Inoue | |
| 2009/0050238 A1* | 2/2009 | Inoue | C23C 22/47 |
| | | | 148/22 |
| 2009/0178734 A1 | 7/2009 | Inoue et al. | |
| 2009/0290953 A1* | 11/2009 | Asai | C23C 28/023 |
| | | | 411/257 |
| 2010/0168308 A1 | 7/2010 | Miyahara et al. | |
| 2015/0218705 A1* | 8/2015 | Kim | C23C 22/53 |
| | | | 428/623 |
| 2016/0214139 A1* | 7/2016 | Yoshida | B05D 7/14 |

FOREIGN PATENT DOCUMENTS

| | | |
|---|---|---|
| JP | 2003-268562 A | 9/2003 |
| JP | 2004-18797 A | 1/2004 |
| JP | 2005-194553 A | 7/2005 |
| JP | 2007-100206 A | 4/2007 |
| JP | 2009-527623 A | 7/2009 |
| JP | 2010-155890 A | 7/2010 |
| JP | 2012-135740 A | 7/2012 |
| WO | 0207902 A2 | 1/2002 |
| WO | 2007/094496 A1 | 8/2007 |
| WO | 2007/100135 A1 | 9/2007 |

OTHER PUBLICATIONS

Japanese Patent Office, Written Opinion of the International Searching Authority in PCT/JP2014/071646, dated Nov. 25, 2014.

* cited by examiner

BLACK COUPLING MEMBER FOR VEHICLES, HAVING EXCELLENT CORROSION RESISTANCE AND BLACK APPEARANCE

CROSS-REFERENCE TO RELATED APPLICATIONS

This application is a U.S. National Stage filing under 35 U.S.C. § 371 of International Application No. PCT/JP2014/071646, filed Aug. 19, 2014, which in turn claims priority to Japanese Application No. 2013-176909, filed Aug. 28, 2013, the entire contents of which are incorporated by reference herein.

TECHNICAL FIELD

The present invention relates to a black fastening member for a vehicle excellent in corrosion resistance and black appearance.

BACKGROUND ART

In the past, many fastening members for vehicles plated with zinc on which black chromate films were formed by using hexavalent chromium were used because of their inexpensiveness, high corrosion preventive effect, and good design. However, with the recent environmental restriction on hexavalent chromium, fastening members for vehicles on which black chemical conversion films are formed by using trivalent chromium as an alternative to hexavalent chromium have been used. When, however, trivalent chromium is used, the corrosion resistance, the scratch resistance, and the black appearance of the member are not stable, which makes it difficult to stably obtain high-quality black members. Especially when a trivalent chromium black chemical conversion treatment liquid is used continuously, zinc is accumulated in the treatment liquid. If the zinc concentration exceeds 10 g/L, it is difficult to manage the liquid for obtaining a good appearance and a good corrosion resistance, and hence it is difficult to stably obtain high-quality members. Moreover, if the zinc concentration exceeds 15 g/L, it is not possible to obtain members having a good black appearance and a high corrosion resistance. For this reason, it is necessary to frequently exchange the treatment liquid, which presents a problem of great increase in costs.

SUMMARY OF INVENTION

Accordingly, an object of the present invention is to impart an excellent black appearance and a high corrosion resistance to a black fastening member for a vehicle at low costs.

The present invention provides a black fastening member for a vehicle comprising: a zinc-plated metal substrate; a trivalent chromium black chemical conversion film on a surface of the metal substrate; and a black coating film on the trivalent chromium black chemical conversion film, wherein the trivalent chromium black chemical conversion film is formed by using a hexavalent chromium-free trivalent chromium black chemical conversion treatment liquid having a Zn ion concentration of 20 g/L or lower, and has a lightness L value of 33 or lower, and the black coating film comprises a blackening component, a modified organopolysiloxane, and a friction coefficient-modifying component with the amount of the blackening component being 2% by weight or more but less than 25% by weight relative to 100% by weight of the black coating film, and has a lightness L value of 28 or lower.

The present invention also provides a method for obtaining a black fastening member for a vehicle having a lightness L value of 28 or lower, the method comprising:

forming a trivalent chromium black chemical conversion film having a lightness L value of 33 or lower on a surface of a zinc-plated metal substrate by using a hexavalent chromium-free trivalent chromium black chemical conversion treatment liquid having a Zn ion concentration of 20 g/L or lower; and forming a black coating film containing a blackening component in an amount of 2% by weight or more but less than 25% by weight relative to 100% by weight of the coating film on the trivalent chromium black chemical conversion film by using a black coating solution comprising the blackening component, a modified organopolysiloxane, and a friction coefficient-modifying component.

The present invention makes it possible to obtain a black fastening member for a vehicle having a lightness L value of 28 or lower, having a high corrosion resistance and a high scratch resistance with an excellent black appearance, and having a modified friction. Moreover, the present invention can be applied even when the Zn ion concentration in a hexavalent chromium-free trivalent chromium black chemical conversion treatment liquid is 20 g/L or lower. Hence, the cost reduction can be achieved because the hexavalent chromium-free trivalent chromium black chemical conversion treatment liquid can be managed easily and because the need for frequent exchange of the treatment liquid is eliminated.

DESCRIPTION OF EMBODIMENTS

A black fastening member for a vehicle of the present invention comprises:

a zinc-plated metal substrate;

a trivalent chromium black chemical conversion film on a surface of the metal substrate; and a black coating film on the trivalent chromium black chemical conversion film.

The above-described black fastening member for a vehicle may be a bolt, a screw, a nut, or a washer, or may also be a pipe joint member, a hose band, or the like.

The lightness L value of the above-described black fastening member for a vehicle is 28 or lower, preferably 26 or lower, and more preferably 25 or lower. When the lightness L value is within the range, an excellent black appearance can be achieved.

The above-described metal substrate may be that of iron or an iron alloy.

The above-described metal substrate is plated with zinc in a usual manner. To deposit zinc plating on the substrate, it is possible to use any one of acidic or neutral baths such as a sulfuric acid bath, a fluoborate bath, a potassium chloride bath, a sodium chloride bath, and an ammonium chloride eclectic bath, and alkaline baths such as a cyanide bath, a zincate bath, and a pyrophosphate bath. Especially, a zincate bath is preferable. In addition, the thickness of the zinc plating deposited on the substrate may be any, and the thickness is 1 μm or more and preferably 5 to 25 μm.

In the present invention, after the zinc plating is deposited on the substrate as described above, the substrate is optionally subjected to a pretreatment such as washing with water or washing with water and a subsequent activation treatment with nitric acid. Then, the substrate is subjected to a chemical conversion treatment by using a chemical conversion treatment liquid for forming a trivalent chromium black chemical conversion film by a method based on, for example, an immersion treatment or the like.

The above-described trivalent chromium black chemical conversion film is formed by using a hexavalent chromium-free trivalent chromium black chemical conversion treatment liquid having a Zn ion concentration of 20 g/L or lower.

The lightness L value of the above-described trivalent chromium black chemical conversion film only needs to be 33 or lower. The fastening member can have a lightness L value of 28 or lower by forming a black coating film containing a blackening component in an amount of 2% by weight or more but less than 25% by weight and having a film thickness of 0.8 µm or more on the trivalent chromium black chemical conversion film.

The amount of chromium ions in the above-described trivalent chromium black chemical conversion film is 0.2 to 3.0 mg/dm$^2$, and preferably 0.5 to 1.5 mg/dm$^2$. When the amount of chromium ions is within the range, a high corrosion resistance with an excellent black appearance can be achieved.

In addition, the thickness of the above-described black coating film is in a range from 0.8 to 5 µm, and preferably from 1.0 to 3.0 µm. When the thickness is within the range, a high corrosion resistance with an excellent black appearance can be achieved. In addition, it is possible to prevent the formation of a pool of the liquid, the generation of a stain, and the decrease in dimensional precision.

The above-described hexavalent chromium-free trivalent chromium black chemical conversion treatment liquid is not particularly limited, as long as a trivalent chromium black chemical conversion film having a lightness L value of 33 or lower can be obtained. A known hexavalent chromium-free trivalent chromium black chemical conversion treatment liquid can be used as the above-described hexavalent chromium-free trivalent chromium black chemical conversion treatment liquid. Examples of such a trivalent chromium black chemical conversion treatment liquid include chemical conversion treatment liquids described in Japanese Patent Application Publication Nos. 2003-268562 and 2007-100206, WO2007/094496, WO2007/100135, etc., and the like. Specifically, for example, any chromium compound containing trivalent chromium ions can be used as a supply source of the trivalent chromium ions contained in the above-described trivalent chromium black chemical conversion treatment liquid, and a trivalent chromium salt such as chromium chloride, chromium sulfate, chromium nitrate, chromium phosphate, or chromium acetate can be used preferably. The concentration of trivalent chromium ions in the treatment liquid is preferably in a range from 0.5 to 20 g/L, and more preferably in a range from 1 to 10 g/L. In the present invention, a trivalent chromium ion concentration within this range is advantageous in terms of the wastewater treatment and is also economically advantageous. Note that the above-described trivalent chromium black chemical conversion treatment liquid is a trivalent chromium black chemical conversion treatment liquid for forming a coating generally called a hexavalent chromium-free trivalent chromium black chemical conversion film.

The above-described trivalent chromium black chemical conversion treatment liquid does not necessarily have to contain a chelating agent. When a chelating agent is contained, the chelating agent may be an organic carboxylic acid having a chelate-forming ability such as oxalic acid, malonic acid, or succinic acid, a salt thereof, or the like. The concentration of the chelating agent in the treatment liquid is preferably in a range from 1 to 40 g/L, and more preferably in a range from 5 to 35 g/L.

The above-described trivalent chromium black chemical conversion treatment liquid may further comprise additional metal ions other than trivalent chromium ions. As the metal ions, metal ions selected from the group consisting of Co, V, Ti, W, Zr, Mn, Mo, Ta, Ce, Sr, Fe, and Al ions may be contained. The concentration of the metal ions in the treatment liquid is preferably in a range from 0.1 to 50 g/L, and more preferably in a range from 0.5 to 20 g/L.

In addition to the above-described components, it is possible to add one or more selected from phosphorous acid, phosphinic acid, alkali salts thereof, and phosphate esters and phosphite esters such as phosphoric acid alkyl esters and phosphorous acid alkyl esters. In this case, the concentration in the treatment liquid is preferably 0.1 to 50 g/L, and more preferably 0.5 to 20 g/L.

In addition to the above-described components, the treatment liquid may comprise a sulfur compound. The sulfur compound may be an inorganic sulfur compound or an organic sulfur compound. Of these sulfur compounds, the sulfur compound is preferably an organic sulfur compound. Especially, thiourea, thioacetic acid, thioglycolic acid, thiomalic acid, thio maleic acid, dithioglycolic acid, dithiodiglycolic acid, sodium salts thereof, and ammonium salts thereof are preferable. The concentration of the sulfur compound in the treatment liquid is preferably 0.1 to 10 g/L.

The zinc ion concentration in the above-described trivalent chromium black chemical conversion treatment liquid increases with the progress of the chemical conversion treatment. The zinc ion concentration in the treatment bath during the use is 20 g/L or less, and preferably in a range from 0.1 g/L to 20 g/L. Too high a zinc ion concentration in the treatment bath is not preferable, because the corrosion resistance and the degree of blackness decrease.

The above-described trivalent chromium black chemical conversion treatment liquid may further comprise one or more inorganic acid ion species selected from the group of ions of phosphorus oxoacids other than phosphorous acid, phosphinic acid, alkali salts thereof, phosphoric acid alkyl esters, and phosphorous acid alkyl esters, chlorine ions, nitrate ions, sulfate ions, and the like. The total concentration of the inorganic acid ions in the treatment liquid is preferably in a range from 1 to 80 g/L, and more preferably in a range from 2 to 20 g/L.

The pH of the above-described trivalent chromium black chemical conversion treatment liquid is preferably 0.5 to 5, and more preferably 1 to 4. The pH can be adjusted by using the above-described inorganic acid or an alkaline agent such as an alkali hydroxide or ammonia water. The balance of the above-described trivalent chromium black chemical conversion treatment liquid other than the above-described components is water.

Regarding the trivalent chromium black chemical conversion treatment film on the surface of the metal substrate in the present invention, the trivalent chromium black chemical conversion treatment film can be formed, for example, on zinc plating by bringing a surface of the zinc-plated metal substrate into contact with the above-described trivalent chromium black chemical conversion treatment liquid. In a general method for bringing a surface of a zinc-plated metal substrate into contact with the above-described trivalent chromium black chemical conversion treatment liquid, for example, a zinc-plated metal substrate is immersed in the above-described trivalent chromium black chemical conversion treatment liquid. For example, the metal substrate is preferably immersed for 5 to 600 seconds with the liquid temperature being 10 to 40° C., and more preferably immersed for 15 to 120 seconds. Note that, in zinc plating, the workpiece is generally immersed in a diluted nitric acid solution to increase the gloss of the trivalent chromium chemical conversion treatment film, before the trivalent chromium black chemical conversion treatment. In the present invention, this pretreatment may be employed, but does not necessarily have to be employed. Regarding conditions and treatment operations other than those described above, conditions and treatment operations similar to those of a conventional chromate treatment method can be employed.

The above-described black coating film is formed by using a black coating liquid comprising a blackening component, a modified organopolysiloxane, and a friction coefficient-modifying component.

The blackening component in the black coating liquid is preferably one or more selected from carbon black pigments and black dyes, and is more preferably a combination of a carbon black pigment and a black dye. The carbon black pigments are not particularly limited, as long as the carbon black pigments are known pigments used for coating materials. The carbon black pigments are readily available as commercial products. The black dyes are not particularly limited, as long as the black dyes are known solvent-soluble black dyes which are used for coating materials and which are soluble in a solvent such as an organic solvent or water. The black dyes are readily available as commercial products. The concentration of the blackening component in the black coating liquid is preferably in a range from 2% by weight, inclusive, to 25% by weight, exclusive, relative to 100% by weight of the coating liquid. In addition, when a combination of a carbon black pigment and a black dye is employed as the blackening component, the ratio of the carbon black pigment to the black dye in terms of carbon black pigment/black dye is in a range from 10/90 to 90/10 parts by weight.

By stacking the trivalent chromium black chemical conversion film having a lightness L value of 33 or lower on the surface of the zinc-plated metal substrate and further stacking the black coating film as described above on the trivalent chromium black chemical conversion film, the resultant coating film of the fastening member for a vehicle according to the present invention has a uniform, stable, and excellent black appearance with the lightness L value being 28 or lower.

The above-described friction coefficient-modifying component is preferably a polyoxyethylene fatty acid ester. The polyoxyethylene fatty acid ester is readily available as a commercial product. The concentration of the polyoxyethylene fatty acid ester in the black coating liquid is preferably in a range from 6 to 18% by weight relative to 100% by weight of the coating liquid.

In addition, the modified organopolysiloxane is preferably a polyoxypropylene-modified organopolysiloxane. The modified organopolysiloxane is readily available as a commercially available polypropylene glycol-modified silicone. The concentration of the modified organopolysiloxane in the black coating liquid is preferably in a range from 92 to 47% by weight relative to 100% by weight of the coating liquid.

In addition to the above-described components, it is possible to optionally use, in the black coating liquid, known coating material additives such as anti-tarnish agents, dispersants, anti-foaming agents, and antiseptics to improve the performances of the coating liquid, within a range not impairing the performance of the black coating film according to the present invention.

In addition, the black coating liquid can be used after being diluted to a suitable concentration by using a diluent for a coating material liquid, for example, by using water and butyl cellosolve. The concentration of the black coating liquid in the diluted black coating liquid is 30 to 100% by weight and preferably 50 to 80% by weight.

The black coating film is obtained by immersing a black fastening member for a vehicle having a surface on which a trivalent chromium black chemical conversion treatment film is formed in the above-described black coating liquid, preferably in the diluted black coating liquid, or by applying the above-described black coating liquid onto the black fastening member for a vehicle with a spray, then sufficiently draining the black coating liquid by centrifugation, and sufficiently drying the coating film. The centrifugal drainage is preferably conducted at 200 to 1000 rpm. In addition, the draining time is preferably 2 to 5 minutes. The drying temperature is preferably 100 to 220° C. In addition, the drying time is preferably 10 to 60 minutes. If the drying temperature is below the drying temperature range, the degree of blackness and the corrosion resistance decrease. If the drying temperature is above the drying temperature range, the corrosion resistance decreases. If the drying time is shorter than 10 minutes, the degree of blackness and the corrosion resistance decrease. In addition, too long a drying time is not economical. Note that, to prevent this coating film from being dissolved in the brake fluid, the drying temperature is set so that the temperature of the surface of the coating film can be 200° C., and the drying time needs to be 20 minutes or more.

A preferred black coating film formed by using the above-described black coating liquid under the above-described treatment conditions is a film comprising, relative to 100% by weight of the coating film:

2% by weight or more but less than 25% by weight of a blackening component comprising a carbon black pigment and a black dye;

6 to 18% by weight of a friction coefficient-modifying component comprising a polyoxyethylene fatty acid ester; and 92 to 47% by weight of a modified organopolysiloxane comprising a polypropylene glycol-modified silicone. The amount of additional components such as the above-described coating material additives other than the blackening component, the modified organopolysiloxane, and the friction coefficient-modifying component in the black coating film is generally 10% by weight or less.

Next, the present invention will be described based on Examples and Comparative Examples; however, the present invention is not limited to Examples.

EXAMPLES

Films were measured according to the following methods.
(Method for Measuring Lightness (L Value))
The lightness (L value) was measured by conducting the color-measuring method according to JIS Z 8722.
(Method for Measuring Amount of Chromium)
A trivalent chromium black chemical conversion film on an M8×35 mm hexagon head bolt which underwent processes up to the formation of the trivalent chromium black chemical conversion film was dissolved in 500 mL/L35% hydrochloric acid. The Cr concentration was measured with an atomic absorption measuring instruments, and the amount of Cr per surface area was calculated.

(Method for Measuring Thickness of Black Coating Film)

A bolt was cut at the center between two surfaces of the head portion, and the film thickness was measured with an electron microscope.

(Method for Evaluating Finished Appearance)

The color of the exterior was visually observed.

(Method for Corrosion Resistance Test)

A salt spray test was conducted according to JIS Z 2371 to evaluate the time to the formation of white rust.

(Method for Evaluating Scratch Resistance)

After fastening with a torque wrench, the ratio of the scratched area was visually determined.

(Method for Measuring Torque Coefficient)

The torque coefficient was measured by the method for a fastening test according to JIS B 1084.

Example 1

M6 bolts (iron) plated with zinc by a zincate process (using NZ-110 bath manufactured by DIPSOL CHEMICALS Co., Ltd.) to a thickness of 8 μm were used. On the bolts, trivalent chromium black chemical conversion films were formed by using trivalent chromium black chemical conversion treatment liquids (Nos. 1, 2, 3, and 4) (ZTB-447S123C3 type manufactured by DIPSOL CHEMICALS Co., Ltd., ZTB-447S1: 50 mL/L, ZTB-447S2: 20 mL/L, and ZTB-447S3: 7 mL/L, chemical conversion treatment conditions: 30° C.×40 seconds) to which zinc nitrate was added with the zinc concentrations being 0, 10, 15, and 20 g/L, respectively. Subsequently, the bolts were subjected to a centrifugal dehydrator (700 rpm, 3 minutes). After that, black coating films were formed by using the black coating liquid shown below, and the bolts were subjected to a centrifugal dehydrator (700 rpm, 3 minutes). After that, the bolts were dried in a forced air oven for 20 minutes with the surface temperature of the bolts being 200° C.

The obtained bolts were measured for the lightness L value and the amount of chromium of the trivalent chromium black chemical conversion film, the thickness of the black coating film, the finished appearance, the lightness L value of the bolt, the corrosion resistance, the scratch resistance, and the torque coefficient.

<Composition of Black Coating Liquid>

| Carbon black | 5% by weight |
| Black dye | 1% by weight |
| Polyoxyethylene fatty acid ester | 10% by weight |
| Polypropylene-modified silicone | 84% by weight |

A diluted coating liquid was prepared by adding 150 g/L of 2-butoxyethanol and water to 700 g/L of the above-described coating liquid.

TABLE 1

| No. | 1 | 2 | 3 | 4 |
|---|---|---|---|---|
| Black chemical conversion treatment | | | | |
| Zn (g/L) | 0 | 10 | 15 | 20 |
| Cr (g/L) | 2.1 | 2.1 | 2.1 | 2.1 |
| Lightness (L value) | 28 | 29 | 32 | 33 |
| Amount of chromium (mg/dm$^2$) | 0.9 | 0.8 | 0.7 | 0.7 |
| Black coating film | | | | |
| Thickness of black coating film (μm) | 2 | 2 | 2 | 2 |
| Finished appearance | Black | Black | Black | Black |
| Lightness (L value) of bolt | 25 | 26 | 27 | 28 |
| Corrosion resistance Time for which no white rust was formed (h) | 480 | 480 | 480 | 480 |
| Scratch resistance | Few scratches (<4%) | Few scratches (<4%) | Few scratches (<4%) | Few scratches (<4%) |
| Torque coefficient | 0.33 | 0.33 | 0.33 | 0.33 |

Comparative Example 1

On zinc-plated bolts of the same type as in Example 1, trivalent chromium black chemical conversion films were formed by using a trivalent chromium black chemical conversion treatment liquid (ZTB-447S123C3 type manufactured by DIPSOL CHEMICALS Co., Ltd., ZTB-447S1: 50 mL/L, ZTB-447S2: 20 mL/L, and ZTB-447S3: 7 mL/L, chemical conversion treatment conditions: 30° C.×40 seconds) to which zinc nitrate was added with the zinc concentration being 25 g/L. Subsequently, the bolts were subjected to a centrifugal dehydrator (700 rpm, 3 minutes). After that, black coating films were formed by using the black coating liquid shown below, and the bolts were subjected to a centrifugal dehydrator (700 rpm, 3 minutes). After that, the bolts were dried in a forced air oven for 20 minutes with the surface temperature of the bolts being 200° C.

The obtained bolts were measured for the lightness L value and the amount of chromium of the trivalent chromium black chemical conversion film, the thickness of the black coating film, the finished appearance, the bolt lightness L value, the corrosion resistance, the scratch resistance, and the torque coefficient.

<Composition of Black Coating Liquid>

| Carbon black | 6% by weight |
| Polyoxyethylene fatty acid ester | 10% by weight |
| Polypropylene-modified silicone | 84% by weight |

A diluted coating liquid was prepared by adding 150 g/L of 2-butoxyethanol and water to 700 g/L of the above-described coating liquid.

Comparative Example 2

On zinc-plated bolts of the same type as in Example 1, trivalent chromium black chemical conversion films were formed by using a trivalent chromium black chemical conversion treatment liquid (ZTB-447S123C3 type manufactured by DIPSOL CHEMICALS Co., Ltd., ZTB-447S1: 50 mL/L, ZTB-447S2: 20 mL/L, and ZTB-447S3: 7 mL/L, chemical conversion treatment conditions: 30° C.×40 seconds) to which zinc nitrate was added with the zinc concentration being 15 g/L. Subsequently, a treatment with a trivalent chromium finishing agent (ZTB-118 type manufactured by DIPSOL CHEMICALS Co., Ltd., ZTB-118: 150 mL, treatment conditions: 45° C.×10 seconds) was conducted, and the bolts were subjected to a centrifugal dehydrator (700 rpm, 3 minutes). After that, the bolts were dried in a forced air oven for 20 minutes with the surface temperature of the bolts being 80° C.

The obtained bolts were measured for the lightness L value and the amount of chromium of the trivalent chromium black chemical conversion film, the thickness of the black coating film, the finished appearance, the bolt lightness L value, the corrosion resistance, the scratch resistance, and the torque coefficient.

Comparative Example 3

On zinc-plated bolts of the same type as in Example 1, trivalent chromium black chemical conversion films were formed by using a trivalent chromium black chemical conversion treatment liquid (ZTB-447S123C3 type manufactured by DIPSOL CHEMICALS Co., Ltd., ZTB-447S1: 50 mL/L, ZTB-447S2: 20 mL/L, and ZTB-447S3: 7 mL/L, chemical conversion treatment conditions: 30° C.×10 seconds) to which zinc nitrate was added with the zinc concentration being 15 g/L. Subsequently, the bolts were subjected to a centrifugal dehydrator (700 rpm, 3 minutes). After that, black coating films were formed by using the black coating liquid shown below, and the bolts were subjected to a centrifugal dehydrator (700 rpm, 3 minutes). After that, the bolts were dried in a forced air oven for 20 minutes with the surface temperature of the bolts being 200° C.

The obtained bolts were measured for the lightness L value and the amount of chromium of the trivalent chromium black chemical conversion film, the thickness of the black coating film, the finished appearance, the bolt lightness L value, the corrosion resistance, the scratch resistance, and the torque coefficient.

<Composition of Black Coating Liquid>

| | |
|---|---|
| Carbon black | 6% by weight |
| Polyoxyethylene fatty acid ester | 10% by weight |
| Polypropylene-modified silicone | 84% by weight |

A diluted coating liquid was prepared by adding 150 g/L of 2-butoxyethanol and water to 700 g/L of the above-described coating liquid.

TABLE 2

| Comparative Example | 1 | 2 | 3 |
|---|---|---|---|
| Black chemical conversion treatment | | | |
| Zn (g/L) | 25 | 15 | 15 |
| Lightness (L value) | 35 | 32 | 35 |
| Amount of chromium (mg/dm$^2$) | 0.7 | 0.7 | 0.2 |
| Black coating film | | | |

TABLE 2-continued

| Comparative Example | 1 | 2 | 3 |
|---|---|---|---|
| Thickness of black coating film (μm) | 2 | 0 | 2 |
| Finished appearance | Light black | Interference color | Light black |
| Bolt lightness (L value) | 30 | 35 | 30 |
| Corrosion resistance Time for which no white rust was formed (h) | 480 | 96 | 240 |
| Scratch resistance | Few scratches (<4%) | Many scratches (20%) | Few scratches (<0.4%) |
| Torque coefficient | 0.34 | 0.40 | 0.35 |

Comparative Example 4

On zinc-plated bolts of the same type as in Example 1, trivalent chromium black chemical conversion films were formed by using a trivalent chromium black chemical conversion treatment liquid (ZTB-447S123C3 type manufactured by DIPSOL CHEMICALS Co., Ltd., ZTB-447S1: 50 mL/L, ZTB-447S2: 20 mL/L, and ZTB-447S3: 7 mL/L, chemical conversion treatment conditions: 30° C.×40 seconds) to which zinc nitrate was added with the zinc concentration being 15 g/L. Subsequently, the bolts were subjected to a centrifugal dehydrator (700 rpm, 3 minutes). After that, black coating films were formed by using the black coating liquid shown below, and the bolts were subjected to a centrifugal dehydrator (700 rpm, 3 minutes). After that, the bolts were dried in a forced air oven for 20 minutes with the surface temperature of the bolts being 200° C.

The obtained bolts were measured for the lightness L value and the amount of chromium of the trivalent chromium black chemical conversion film, the thickness of the black coating film, the finished appearance, the bolt lightness L value, the corrosion resistance, the scratch resistance, and the torque coefficient.

<Composition of Black Coating Liquid>

| | |
|---|---|
| Carbon black | 6% by weight |
| Polyoxyethylene fatty acid ester | 10% by weight |
| Polypropylene-modified silicone | 84% by weight |

A diluted coating liquid was prepared by adding 400 g/L of 2-butoxyethanol and water to 200 g/L of the above-described coating liquid.

Comparative Example 5

On zinc-plated bolts of the same type as in Example 1, trivalent chromium black chemical conversion films were formed by using a trivalent chromium black chemical conversion treatment liquid (ZTB-447S123C3 type manufactured by DIPSOL CHEMICALS Co., Ltd., ZTB-447S1: 50 mL/L, ZTB-447S2: 20 mL/L, and ZTB-447S3: 7 mL/L, chemical conversion treatment conditions: 30° C.×40 seconds) having a zinc concentration of 15 g/L. Subsequently, the bolts were subjected to a centrifugal dehydrator (700 rpm, 3 minutes). After that, black coating films were formed by using the black coating liquid shown below, and the bolts were subjected to a centrifugal dehydrator (700 rpm, 3 minutes). After that, the bolts were dried in a forced air oven for 20 minutes with the surface temperature of the bolts being 200° C.

The obtained bolts were measured for the lightness L value and the amount of chromium of the trivalent chromium black chemical conversion film, the thickness of the black coating film, the finished appearance, the bolt lightness L value, the corrosion resistance, the scratch resistance, and the torque coefficient.

<Composition of Black Coating Liquid>

| | |
|---|---|
| Carbon black | 6% by weight |
| Polyoxyethylene fatty acid ester | 0% by weight |
| Polypropylene-modified silicone | 94% by weight |

A diluted coating liquid was prepared by adding 150 g/L of 2-butoxyethanol and water to 700 g/L of the above-described coating liquid.

TABLE 3

| Comparative Example | 4 | 5 |
|---|---|---|
| Black chemical conversion treatment | | |
| Zn (g/L) | 15 | 15 |
| Lightness (L value) | 32 | 32 |
| Amount of chromium (mg/dm$^2$) | 0.7 | 0.7 |
| Black coating film | | |
| Friction coefficient-modifying component | Contained | Not contained |
| Thickness of black coating film (μm) | 0.7 | 2 |
| Finished appearance | Light black | Black |
| Bolt lightness (L value) | 30 | 28 |
| Corrosion resistance Time for which no white rust was formed (h) | 360 | 480 |
| Scratch resistance | Few scratches (<4%) | Few scratches (<4%) |
| Torque coefficient | 0.34 | 0.55 |

The invention claimed is:

1. A black fastening member for a vehicle, comprising:
   a zinc-plated metal substrate;
   a trivalent chromium black chemical conversion film on a surface of the metal substrate; and
   a black coating film on the trivalent chromium black chemical conversion film, wherein
   the trivalent chromium black chemical conversion film is formed by using a hexavalent chromium-free trivalent chromium black chemical conversion treatment liquid having a Zn ion concentration of 20 g/L or lower, and has a lightness L value of 33 or lower, and
   the black coating film comprises a blackening component, a modified organopolysiloxane, and a friction coefficient-modifying component with the amount of the blackening component being 2% by weight or more but less than 25% by weight relative to 100% by weight of the black coating film, and has a lightness L value of 28 or lower.

2. The black fastening member for a vehicle according to claim 1, wherein
   the amount of chromium in the trivalent chromium black chemical conversion film is in a range from 0.3 to 3.0 mg/dm$^2$.

3. The black fastening member for a vehicle according to claim 1, wherein
   the black coating film has a thickness in a range from 0.8 to 5 μm.

4. The black fastening member for a vehicle according to claim 1, wherein
   the black coating film comprises, relative to 100% by weight of the black coating film,
   the blackening component in an amount of 2% by weight or more but less than 25% by weight, the blackening component comprising carbon black and a black dye,
   a polyoxyethylene fatty acid ester as the friction coefficient-modifying component in an amount of 6 to 18% by weight, and
   a polypropylene glycol-modified silicone as the modified organopolysiloxane in an amount of 92 to 47% by weight.

5. A method for obtaining a black fastening member for a vehicle having a lightness L value of 28 or lower, the method comprising:
   forming a trivalent chromium black chemical conversion film having a lightness L value of 33 or lower on a surface of a zinc-plated metal substrate by using a hexavalent chromium-free trivalent chromium black chemical conversion treatment liquid having a Zn ion concentration of 20 g/L or lower; and
   forming a black coating film containing a blackening component in an amount of 2% by weight or more but less than 25% by weight relative to 100% by weight of the coating film on the trivalent chromium black chemical conversion film by using a black coating solution comprising the blackening component, a modified organopolysiloxane, and a friction coefficient-modifying component.

6. The black fastening member for a vehicle according to claim 1, which is a bolt, a screw, a nut, or a washer.

7. The method according to claim 5, wherein
   the black fastening member for a vehicle is a bolt, a screw, a nut, or a washer.

* * * * *